United States Patent [19]

Civanlar et al.

[11] Patent Number: 5,581,552
[45] Date of Patent: Dec. 3, 1996

[54] MULTIMEDIA SERVER

[75] Inventors: Seyhan Civanlar, Middletown Township; Vikram R. Saksena, Freehold, both of N.J.

[73] Assignee: AT&T, Holmdel, N.J.

[21] Appl. No.: 447,666

[22] Filed: May 23, 1995

[51] Int. Cl.$^6$ .................................................. H04L 12/56
[52] U.S. Cl. ................................ 370/396; 370/401
[58] Field of Search .................. 370/94.1, 60, 60.1, 370/110.1, 58.1, 58.2, 58.3, 94.2, 85.13, 85.14, 94.3; 379/201, 207, 94, 220, 221, 112; 348/14, 6, 7, 8, 12, 13

[56] References Cited

U.S. PATENT DOCUMENTS

| | | | |
|---|---|---|---|
| 4,565,903 | 1/1986 | Riley | 379/201 |
| 4,823,338 | 4/1989 | Chan et al. | 370/85 |
| 5,278,889 | 1/1994 | Papanicolaou et al. | 379/230 |
| 5,329,308 | 7/1994 | Binns et al. | 348/18 |
| 5,473,679 | 12/1995 | La Porta et al. | 370/60.1 |

Primary Examiner—Douglas W. Olms
Assistant Examiner—Ajit Patel
Attorney, Agent, or Firm—Eugene Rosenthal; Stephen Gurey

[57] ABSTRACT

A pool of multimedia servers, which may be geographically diverse, are available to be allocated to serve one of at least two ELANs served by an ELAN contronect network. These multimedia servers are a) connected to, b) dynamically allocated to sub-ELANs, and c) managed by, a multimedia server manager, which is included as part of the ELAN contronect network. In particular, each of the multimedia servers is capable of having its addresses dynamically reconfigured in response to commands from the multimedia server manager to match that of an ELAN to which it is being made available, so that the multimedia server becomes a part of that ELAN. The multimedia server manager obtains a layer-3 address from address server 427 of the ELAN contronect network which it then assigns to the multimedia server so that the multimedia server appears to be a part of the ELAN to which it is assigned to serve. The multimedia server manager also supplies to the multimedia server the LES and BUS address of a sub-ELAN of the ELAN to which it is assigned to serve. The multimedia server can then join with the LES and BUS as a LEC in that sub-ELAN.

33 Claims, 7 Drawing Sheets

MULTIMEDIA SERVER

TECHNICAL FIELD

This invention relates to providing multimedia services using a distributed server model.

BACKGROUND OF THE INVENTION

The current embedded base of data networks are based on IEEE 802 Local Area Networks, i.e., so-called "Legacy LANs". These Legacy LANs are so-called "connectionless" networks, because network entities exchange packets without establishment of a layer-2 connection. Many existing and emerging applications are designed to run primarily on Legacy LANs. These applications reside on top of so-called "layer-2" and "layer-3" protocols such as Medium Access (MAC) and Internet Protocol (IP), respectively. As is well known in the art, the layers referred to are those of the international standards organization (ISO) seven layer networking reference model.

A classical method for interconnecting different LANs is so-called "bridging and routing". Inter-LAN communication according to this technique is achieved through the use of an external router. A deficiency of this method is that, since it is based on a broadcast principle, and thus mimics shared-medium operations, all data packets are broadcast to all ATM destinations, thereby flooding the network with broadcast traffic. Another deficiency is that the broadcast nature of the technique virtually requires a mesh network between all bridges and ATM hosts within a LAN, and all inter-LAN traffic must pass through the router.

The ATM Forum has developed a better solution based on bridging called LAN Emulation (LANE), to interconnect Legacy LANs and native ATM hosts. LANE relies on a LAN Emulation Server (LES), which performs ATM-to-MAC address resolution, i.e., translation, and a Broadcast and Unknown Server (BUS), which performs data broadcast.

Generally speaking, LAN emulation clients (LECs) are ATM end-stations or ATM-capable bridges that are directly connected to an ATM network connecting Legacy LANs "behind" them to the ATM network. An LE_ARP request allows a LEC to request an ATM address corresponding to a MAC address from a LES. The LE_ARP request is defined in the ATM Forum's LAN Emulation Over ATM Specifications, Version 1.0, which is incorporated herein by reference and the contents of which are well known by those skilled in the art. It is noted that a so-called "Proxy LEC" represents multiple end-point addresses, e.g., the MAC addresses of several hosts. For a more detailed description of the definitions of LEC and proxy LEC reference may be made to the above-mentioned ATM Forum's LAN Emulation Over ATM Specifications, Version 1.0.

Broadcast data packets, such as a so-called "ARP_Request", are forwarded to a BUS, which in turn broadcasts them to all LECs. "ARP_Requests" are defined in Bell Communications Research (Bellcore) request for comments (RFC) 826, which is incorporated herein by reference. Also, data packets are sent to a BUS until a direct ATM connection is established to the target address within the Emulated LAN.

The communications between two Emulated LANs (ELANs) is done via an external router. Either the router has the ATM address of the destination LEC, or it requests the address from the LES serving the destination LEC. The router then builds an ATM connection to the destination LEC, and send thereto the data packet. Thus, disadvantageously, all inter-LAN packets must pass through the router, which may become a communications bottleneck, due to low throughput of conventional routers.

A third method builds upon LANE, but incorporates the routing function as well as bridging function into a so called multi-layer LAN switch. Fundamentally, there are three major functions associated with routing: 1) routing, i.e., determination of the layer-3 address of the next-hop-router along the path to the target address, 2) address resolution or translation, i.e., determination of a router's ATM address corresponding to its layer-3 address, and 3) data forwarding, i.e., relaying data packet from one port of the router to another port. A traditional router performs functions (1) and (3) while function (2) is required because an ATM connection must be established between adjacent ATM router hops or to the target ATM address. A multi-layer switch performs only function (3), i.e., data forwarding.

A route server is used to store the next-hop router's layer-3 address, and an address resolution protocol (ARP) server is used to resolve, i.e., translate, layer-3 addresses to ATM addresses. Sometimes these functions are merged into one server, a so-called "Route/ARP Server". With a multi-layer LAN switch, the intra-LAN communication is performed just as in LANE using the local LES and BUS of each ELAN. However, inter-LAN communication is different.

For example, if a host wants to talk to a host in a different ELAN, then the LEC for that host acts as a router, obtains either the a) destination's, or b) the next-hop-router's IP address from the route server, and obtains the corresponding ATM address from an ARP server. It then establishes an ATM connection directly to the destination LEC serving the host and sends the data packet.

This method is more efficient than using an external router since the external router hop is eliminated. Further efficiency is obtained by each multi-layer switch performing fast data forwarding both for layer-2 and 3 packets, while complicated route determination and address resolution functions are logically removed from the switches. Although the Route Server decouples the routing from data forwarding, it only can serve a few logical subnets, and is thus not suited to cover large number of logical subnets. As the number of subnets governed by a single route server increases the efficiencies provided with this approach greatly diminish, since several router hops become practically unavoidable.

Thus, the existing LANE and Route/ARP Server methods work effectively only for small scale local networks.

The forgoing problems with interconnecting ELANs are overcome, as described in U.S. patent application Ser. No. 08/402,235, filed Mar. 10, 1995 (Chang 1-1-1), which is incorporated herein by reference, by employing a so-called "ELAN contronect network" which is a separate network for interconnecting the servers of the sub-ELANs, where a sub-ELAN is a part of an ELAN having its own LES and BUS that may also be configured as a stand-alone ELAN. Each of the sub-ELANs is connected to the ELAN contronect network via a point-to-point connection-oriented connection, and the ELAN contronect network is configured to present itself to each of the servers of the sub-ELANs as clients thereof.

In one such system, the ELAN contronect network includes an address server and a broadcast/route server interconnected over a high-speed backbone. Also connected to the high-speed backbone is at least one LAN hub, which connects to at least one server of at least one of the ELANs.

The address server contains an address data base for performing address resolution, i.e., translation, between the at least two addresses of each ELAN end-point in response to requests for such translations. The broadcast/route server receives data packets for broadcast to a different sub-ELAN from which the packets originated and broadcasts the received data packets to at least one other sub-ELAN. The broadcast/route server also recognizes that a packet which is a broadcast packet at layer-2 is actually a request for an address resolution at layer-3. If so, the broadcast/route server collaborates with the address server to perform the necessary address resolution and insures that a response is sent only to the client originating the request.

Optionally, the ELAN contronect network also includes a configuration server and one or more multimedia servers, i.e., a multimedia server farm.

SUMMARY OF THE INVENTION

We have recognized that, although it is possible to provide multimedia services using a multimedia server farm as part of the ELAN contronect network, or by embedding multimedia servers within an ELAN as LECs therein, such multimedia servers a) become bottlenecks during peak usage of multimedia services, b) strains the bandwidth of the ELAN contronect backbone, and c) creates a single point of failure for the multimedia service. Moreover, the capability of providing a multimedia service within an ELAN is fixed by the capacity of the servers that are a part of that ELAN. While it is possible for a LEC of an ELAN to obtain a multimedia service from another ELAN, doing so requires going through multiple router hops, which diminishes the performance of the services as well as creating issues of security.

Therefore, in accordance with the principles of the invention, a pool of multimedia servers, which may be geographically diverse, are available to be allocated to serve one of at least two ELANs served by an ELAN contronect network. These multimedia servers are a) connected to, b) dynamically allocated to sub-ELANs, and c) managed by, a multimedia server manager, which is included as part of the ELAN contronect network. In particular, each of the multimedia servers is capable of having its addresses dynamically reconfigured in response to commands from the multimedia server manager to match that of an ELAN to which it is being made available, so that the multimedia server becomes a part of that ELAN. The multimedia server manager obtains a layer-3 address from address server 427 of the ELAN contronect network which it then assigns to the multimedia server so that the multimedia server appears to be a part of the ELAN to which it is assigned to serve. The multimedia server manager also supplies to the multimedia server the LES and BUS address of a sub-ELAN of the ELAN to which it is assigned to serve. The multimedia server can then join with the LES and BUS as a LEC in that sub-ELAN.

All requests for multimedia service by a LEC are initially directed to the multimedia server manager. The multimedia server manager, in turn, returns to the LEC at least the layer-3 address of the multimedia server that will provide the requested service. Thereafter, LECs in the sub-ELAN can connect to the multimedia server specified by the multimedia server manager directly, while LECs within the ELAN, but not the same sub-ELAN of the multimedia server, establish connections to the multimedia server using the ELAN contronect network. Advantageously, a LEC of the ELAN need not go through a router or a route server to access to multimedia server. Also advantageously, additional multimedia servers can be allocated from the pool to serve an ELAN in the event of increased demand within the ELAN or failure of any previously assigned multimedia server.

Each multimedia server has two states, 1) an availability state and 2) a service state. The availability state can take one of two values, a) "available", which indicates the server is working properly, and b) "unavailable", which indicates that the server is down or otherwise inaccessible. The service state of each multimedia server can take one of three values, 1) "idle", indicating that there are no LECs being served by the multimedia server, 2) "active", indicating that there is at least one LEC being served by the multimedia server but that there remains in the multimedia server additional capacity to serve other LECs, and 3) "busy", indicating that a predetermined service capacity threshold has been reached. In one embodiment of the invention, the busy value indicates that the multimedia server cannot serve any additional LECs.

In a particular embodiment of the invention, the state of each multimedia server is monitored by the multimedia server manager. The multimedia server manager only allocates a server when the multimedia server's availability state is available and its service state is idle. Moreover, the multimedia server manager will only allocate a new multimedia server to an ELAN when the already allocated multimedia server for a particular service becomes unavailable or busy.

DETAILED DESCRIPTION

Figure 1:
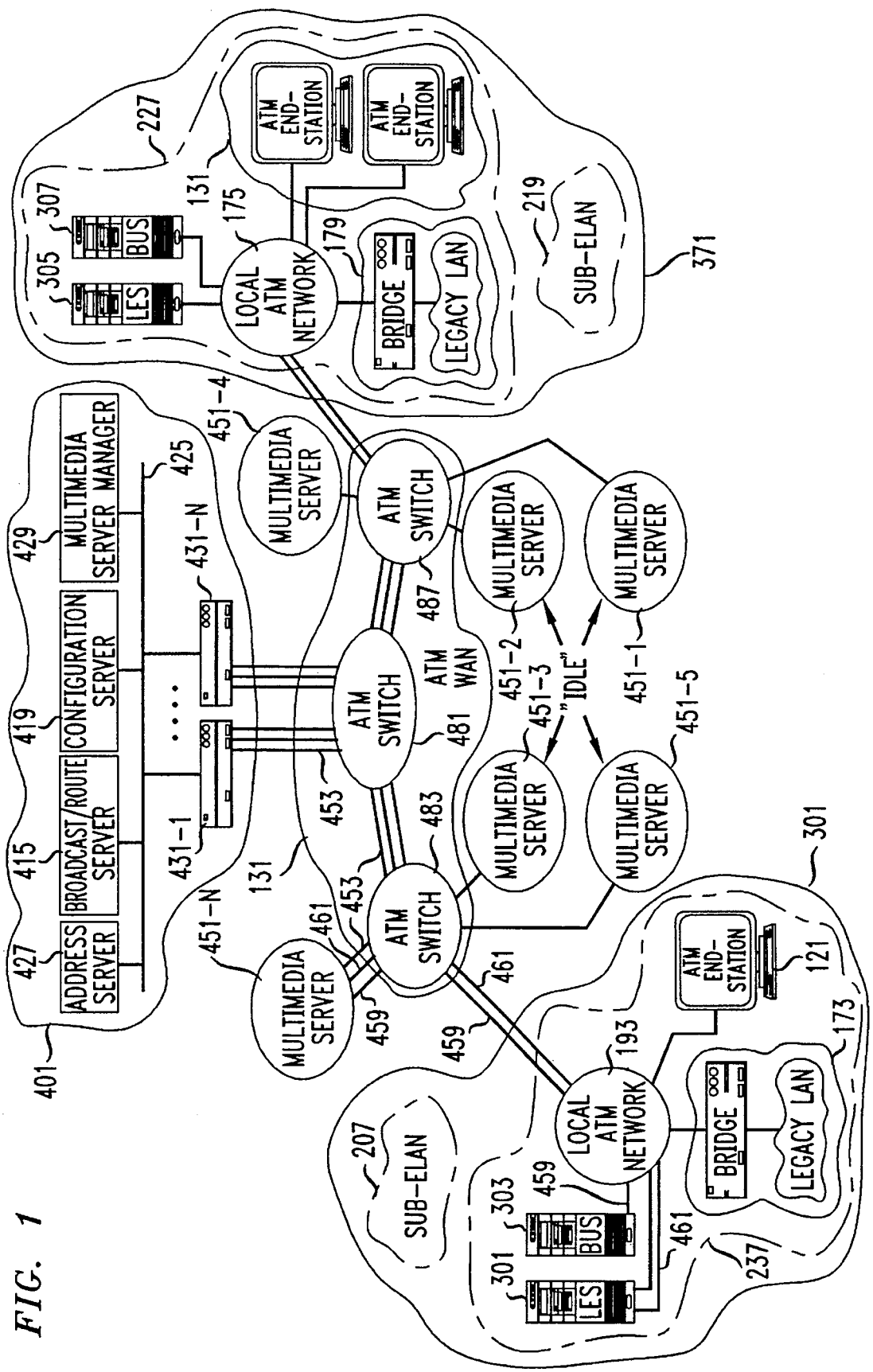
FIG. 1 shows an exemplary embodiment of the invention in which an ELAN contronect network is arranged to interconnect several sub-ELANs in accordance with the principles of the invention.
Figure 2:
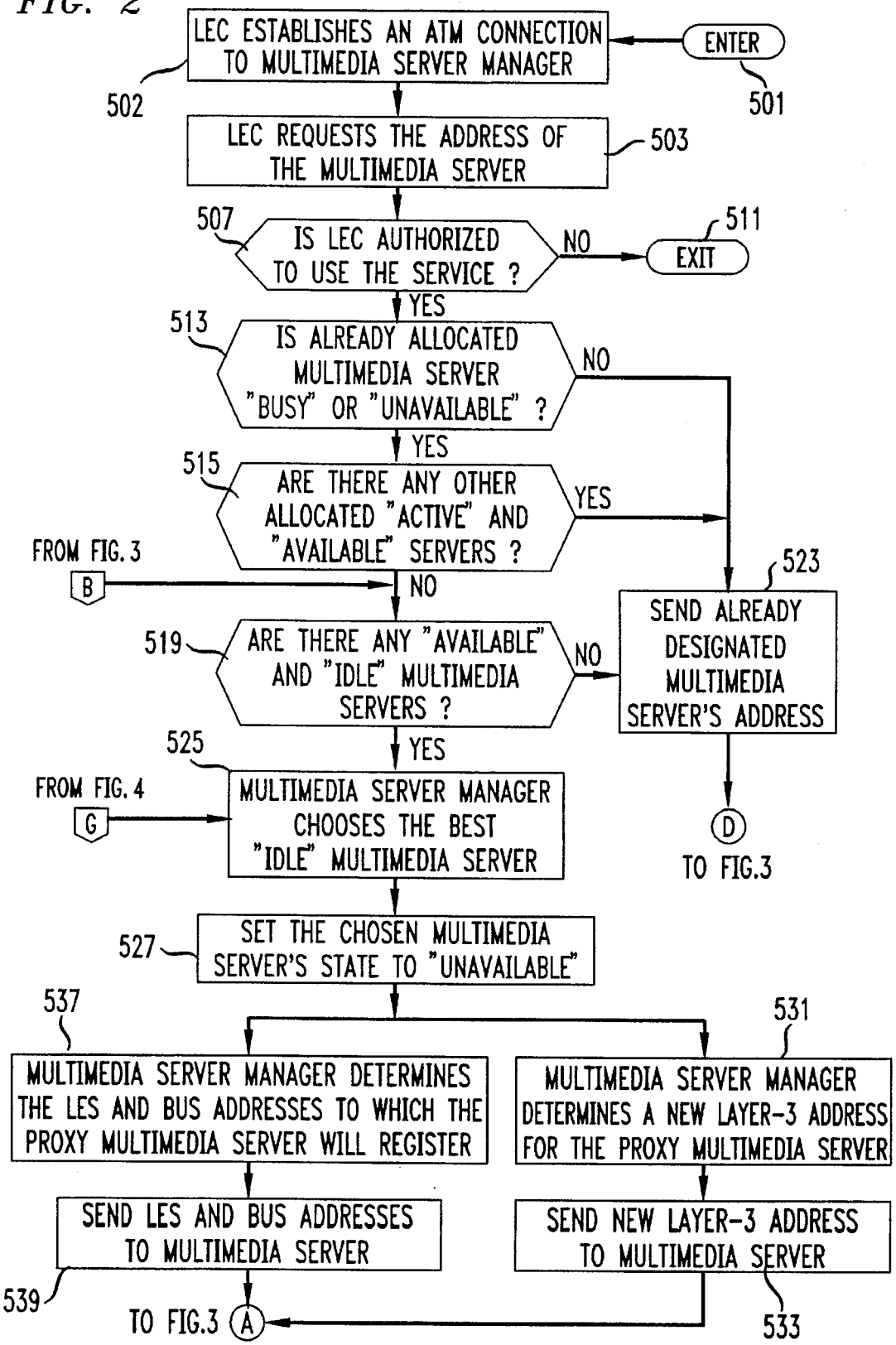
FIGS. 2, 3, 4, 5, and 6, when connected together, show an exemplary procedure for processing packets in the system of FIG. 1, in accordance with the principles of the invention.
Figure 3:
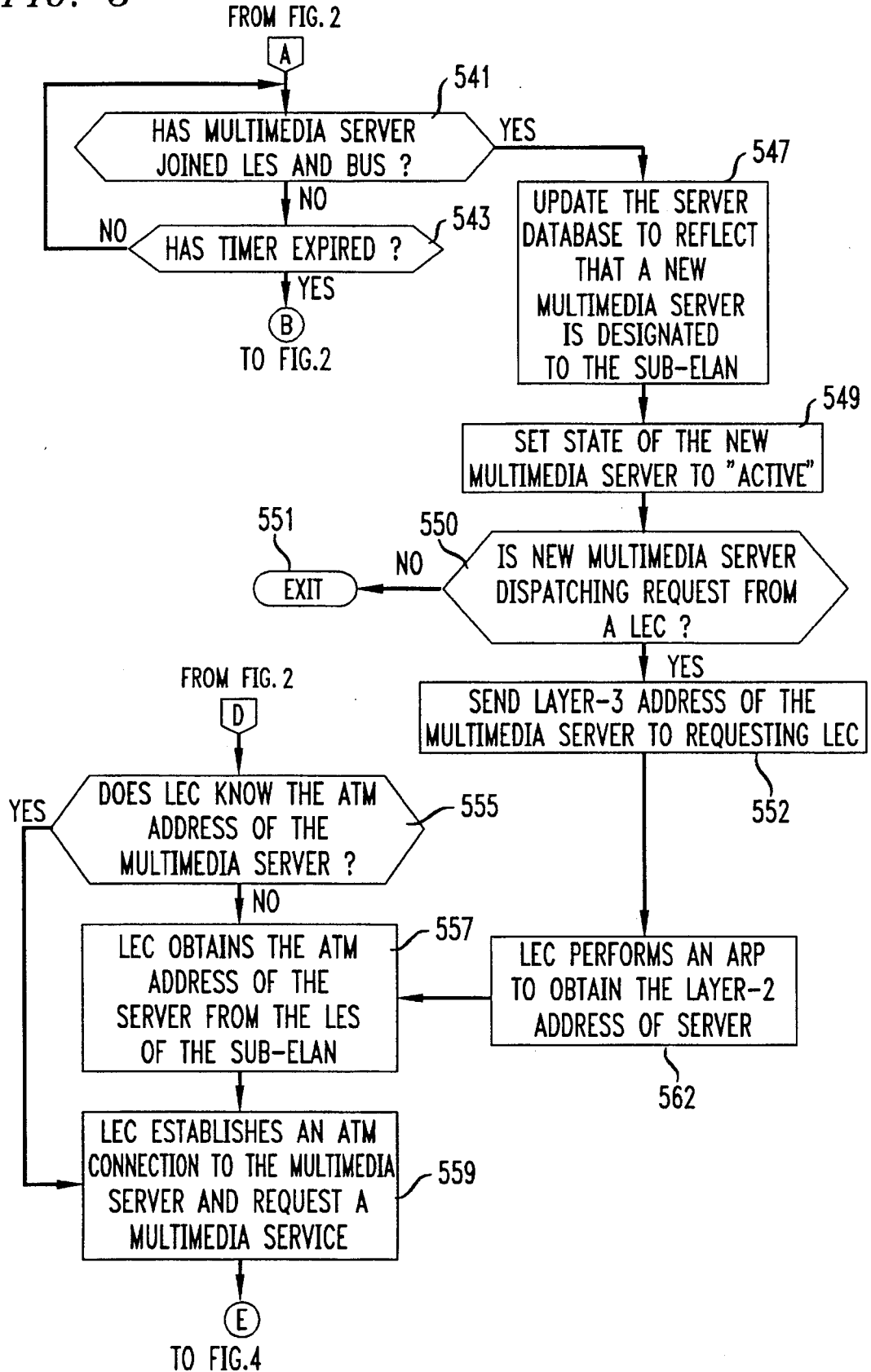
Figure 4:
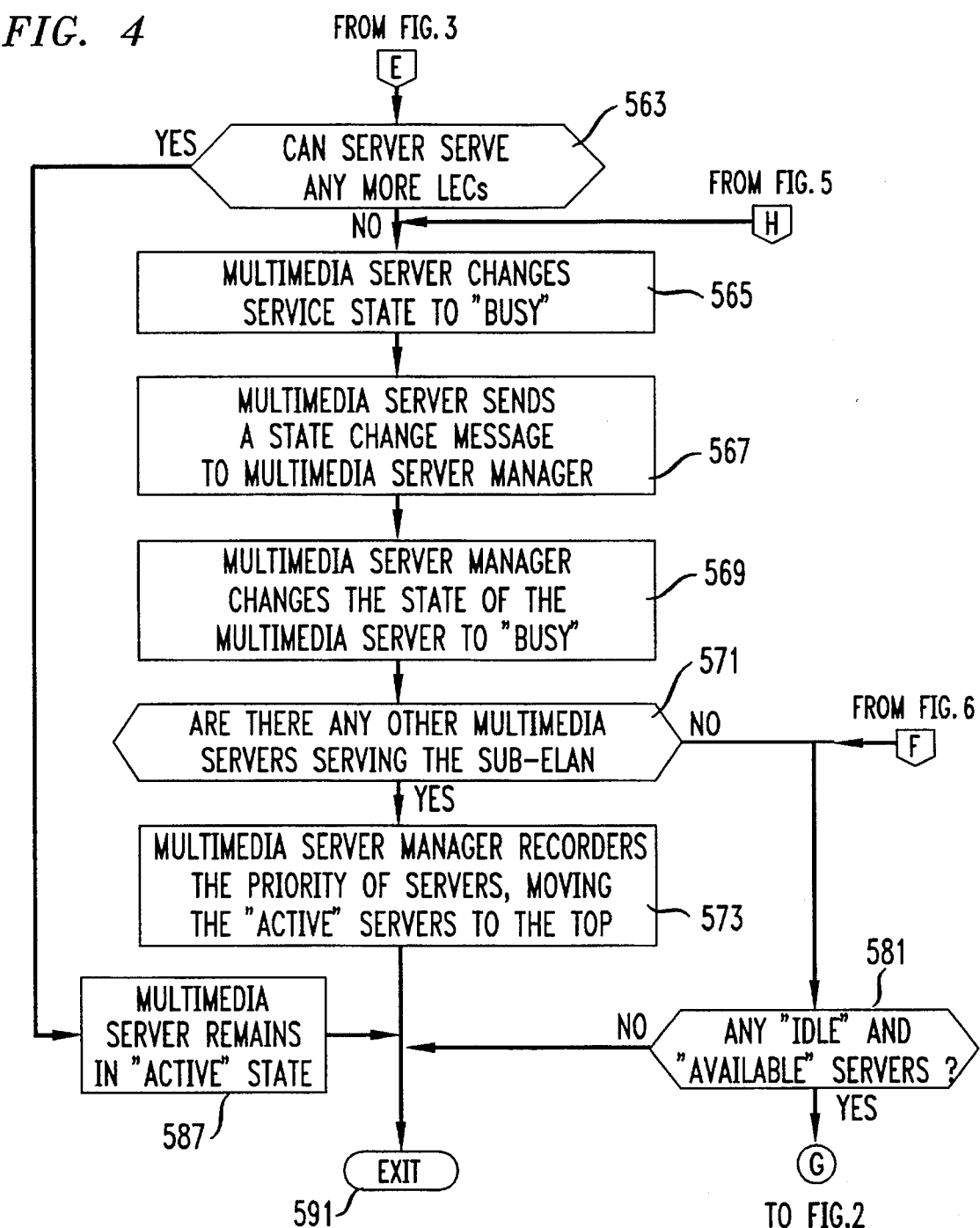

FIG. 1 shows an exemplary embodiment of the invention in which ELAN contronect network 401 is arranged for interconnecting the servers of sub-ELANs 207, 219, 227 and 237 in accordance with the principles of the invention. For clarity of exposition, only sub-ELANs 227 and 237 are shown in detail. Sub-ELAN 227 includes bridge and legacy LAN 179, ATM end-stations 131, ATM switch 175, and associated servers LES 305 and BUS 307. Sub-ELAN 237 includes bridge and legacy LAN 173, ATM end-station 121, ATM switch 193, and associated servers LES 301 and BUS 303. ELAN contronect network 401 includes a) address server 427, b) broadcast/route server 415, c) optional configuration server 419, d) multimedia server manager 429, and e) LAN hubs 431, which includes LAN hub 431-1 through 431-N, connected via high speed backbone 425.

Each of sub-ELANs 207, 219, 227 and 237 is connected to ELAN contronect network 401 via a point-to-point connection-oriented connection through asynchronous transfer mode (ATM) wide area network 131. ELAN contronect network 401 is configured to present both a) address server 427 and b) broadcast/route server 415, as LECs, and more particularly, as proxy LECs, to each of servers 301, 303, 305, and 307 of sub-ELANs 227 and 237, as well as to the servers of sub-ELANs 207 and 219 (not shown). Address server 427 and broadcast/route server 415 are "proxy" in that they represent all other end-station addresses not within each respective sub-ELAN.

Address server 427 performs address resolution, i.e., address translation, between various network end-point layer-3 and layer-2 addresses. As is well known in the art, each network end-point, i.e., any unit connected to send and receive data packets, may have more than one address, i.e., an identifier, by which it is known. Thus, a first end-point may know a particular address for a second end-point but not the second end-point's other corresponding address which may be required in order to exchange data packets with the second end-point. The information necessary to perform such address translation is stored in an address table. Table 1 is an exemplary address table. Table 1 assumes that there are N legacy end-stations in the legacy LAN. If address server 427 does not contain within itself the necessary information to perform a required address translation, i.e., the necessary entries are not present in its address table, address server 427 is able to engage the necessary processes in order to obtain and store within itself the necessary information. Thereafter address server 427 will be able to directly perform the required address translation.

TABLE 1

| ATM address | Layer-2 address | Layer-3 address |
| --- | --- | --- |
| ATM-173 | MAC-173-01 | IP-173-01 |
| ATM-173 | MAC-173-02 | EP-173-02 |
| . | . | . |
| . | . | . |
| . | . | . |
| ATM-173 | MAC-173-ON | IP-173-ON |
| ATM-121 | MAC-121 | IP-121 |

Broadcast/route server 415 performs several functions relating to communicating to more than one end-point at a time. In particular broadcast/route server 415 receives a data packet from a sub-ELAN of a particular ELAN and sends it to one or more sub-ELANs in the same or a different ELAN. Broadcast/route server 415 also recognizes that a data packet which is indicated to be a broadcast packet at layer-2 actually contains a layer-3 address resolution request. When such data packets are recognized, broadcast/route server 415 communicates with address server 427 to obtain the requested address. Broadcast/route server 415 then transmits the translated address directly to the end-point which originated the data packet. Advantageously, doing so eliminates the need for additional transmissions of the data packet.

An optional function of broadcast/route server 415 is to act as a router for packets addressed to it by a router/ARP server and requesting routing of the packets. Typically such requests are performed at layer-3, and require a packet to be sent to an ELAN other than the ELAN of the packet-originating end-point. Advantageously, since broadcast/route server 415 is aware of all the layer-3 addresses of those end points that subscribe to service by ELAN contronect network 401, packets can be routed to the ultimate destination in no more than two hops, i.e., via the route/ARP server of the sub-ELAN from which the packet originated and then via broadcast/route server 415.

Optional configuration server 419 operates to group one or more sub-ELANs into an ELAN regardless of the locations of the sub-ELANs. Configuration server 419 can serve more than one ELAN. For example, configuration server 419 has configured sub-ELAN 207 and sub-ELAN 237 into ELAN 301. Likewise, configuration server 419 has configured sub-ELAN 227 and sub-ELAN 219 together into ELAN 371.

Configuration server 419 operates by communicating with address server 427 and broadcast/route server 415 to establish connections between the servers of the sub-ELANs to be joined into a single ELAN while ensuring the disjointedness of the distinct ELANs. One method for achieving this result is to group together at least one set of the addresses corresponding to servers serving the sub-ELANs of an ELAN in a so called "configuration table". For example, the addresses employed may be the ATM addresses. Packets originating from an address within a particular group of sub-ELANs may only be transmitted to end-points having addresses within the same group.

By using the same type of arrangement, in accordance with the principles of the invention, configuration server 419 also controls access by the various ELANs and sub-ELANs to services provided under the management of multimedia server manager 429. This will be further described hereinbelow.

The multimedia services available to an end-point depends on the services to which the ELAN to which the end-point belongs has subscribed. Exemplary services provided under the control of multimedia server manager 429 include a) multipoint video teleconferencing, b) multipoint whiteboarding, c) video-on-demand, and d) delayed playback of retrieved files. In order to obtain such services, an end-point requests a connection to multimedia server manager 429 as an end-point itself, with the request specifying the particular service required.

Multimedia server manager 429 stores service definitions, including program code and program content, for the multimedia services provided by all multimedia servers 451. Program content includes, for example, video, text and audio files, and optionally, links to servers from which such files can be retrieved. Multimedia server manager 429 can also send program code and program content to multimedia servers 451 to ensure that these servers have the most current version of the multimedia services requested by the LECs.

Similarly, multimedia servers 451 contain stored program code and program content for the particular services they are capable of delivering at any particular time. The multimedia servers 451 also contain means of receiving updated program code and program content from the multimedia server manager 429. It can also exchange multimedia data with the LECs during a multimedia session.

Advantageously, such an architecture provides for a single point of control and maintenance for each multimedia service while enabling the service to be provided from several geographically diverse locations. Thus, for example, a single copy of a book, newspaper, magazine or movie may be loaded into multimedia server manager 429 and access to it by the various ELANs served by ELAN contronect network 401 is made available by the ones of multimedia servers 451 serving those ELANS.

LAN hubs 431 provide conversion from ATM to the protocol of high-speed backbone 425. For each LES, BUS, and route/ARP server in each of the sub-ELANs there is a single ATM connection to one of LAN hubs 431.

Multimedia servers 451, which include multimedia servers 451-1 to 451-N, are each connected to one of the ATM switches. Each multimedia server has two states, 1) an availability state and 2) a service state. The availability state can take one of two values, a) "available", which indicates the server is working properly, and b) "unavailable", which indicates that the server is down or otherwise inaccessible. The service state of each multimedia server can take one of three values, 1) "idle", indicating that there are no LECs being served by the multimedia server, 2) "active", indicating that there is at least one LEC being served by the multimedia server but that there remains in the multimedia server additional capacity to serve other LECs, and 3) "busy", indicating that a predetermined service capacity threshold has been reached. In one embodiment of the invention, the busy value indicates that the multimedia server cannot serve any additional LECs.

Multimedia server manager 429 of ELAN contronect network 401 dynamically allocates multimedia servers 451 so that multimedia servers 451 can offer multimedia services requested by LECs. Multimedia server manager 429 is connected with a permanent or switched ATM connection to each of multimedia servers 451. For example, multimedia server 451-N connects to the multimedia server 429 via ATM connection 453, which passes through ATM switches 483 and 481 of wide-area network (WAN) 131. ATM connection 453 terminates on LAN hub 431, which converts between ATM and the format of high-speed backbone 425, so that packets can be exchanged between multimedia server manager 429 and multimedia server 451-N in ATM wide-area network (WAN) 131.

Each LEC served by ELAN contronect network 401 is able to communicate with multimedia server manager 429 by establishing an ATM connection to it. The layer-3 and ATM addresses of multimedia server manager 429 is known by each LEC. The addresses of multimedia server manager 429 can be provided to each LEC via a multimedia application software.

Multimedia server manager 429 interacts with a LEC when a LEC requests a multimedia service from multimedia server manager 429, e.g., by connecting to it and choosing the requested service from a multimedia service menu that resides on multimedia server manager 429. By choosing a multimedia service, the LEC is also transparently requesting from multimedia server manager 429 the address of one of multimedia servers 451 that will be providing the requested multimedia service. Application software provided in the LEC requests the multimedia service and the address of the serving multimedia server.

The LEC may request the address of one of multimedia servers 451 at any of the following points: A) The LEC can request an address each time it accesses the multimedia server manager 429 for a multimedia service, although the LEC may already have an address of a multimedia server in its cache; B) The LEC may request an address only those times that it accesses the multimedia server manager 429 for a multimedia service when there is not any address of a multimedia server in its cache; and C) The LEC may request an address only those times that it accesses multimedia server manager 429 for a multimedia service when the multimedia server for which it has an address in its cache is not capable of serving the LEC. In response to any requests, multimedia server manager 429 responds to the LEC with the layer-3 address of one of multimedia servers 451 that can provide the multimedia service which is selected by the LEC.

Multimedia server manager 429 can respond to the LEC with the address of an active one of multimedia servers 451, i.e., one of multimedia servers 451 which is already serving other LECs in the ELAN of the requesting LEC, if such a server is available. Multimedia server manager 429 can respond to the LEC with the address of a newly joined idle one of multimedia servers 451 whose presence was not known by the LEC, i.e., a server that has not been serving any clients in the ELAN of the LEC and joined with one of the LES and BUS of the ELAN of the LEC after the last multimedia session of the LEC. If there are no active or idle ones of multimedia servers 451 for serving the LEC, multimedia server manager 429 responds to the LEC with the address of a currently busy server. If there are multiple ones of multimedia servers 451 available to serve the LEC, the multimedia server manager 429 responds with the layer-3 address of one of them to ensure that one or more of these servers can be freed up quickly, so that they can serve other sub-ELANs.

Multimedia server manager 429 monitors the state changes of each of multimedia servers 451. If one of multimedia servers 451 determines that it can not serve any additional LECs, i.e., its service state has changed from active to busy, it transmits a message to this effect to multimedia server manager 429. Upon receipt of this message, multimedia server 429 allocates another idle or active one of multimedia servers 451 to serve the sub-ELANs that are being served by the busy one multimedia servers 451, in accordance with an aspect of the invention. An active one of multimedia servers 451 can be selected only if it is already serving other LECs in the same ELAN of the busy one of multimedia servers 451. Otherwise, multimedia server manager 429 selects an idle server, which may not already be part of the ELAN of the LEC, to serve in place of the busy one of multimedia servers 451.

Multimedia server manager 429 receives state-change messages from multimedia servers 451 as follows: A) if a timer has expired, multimedia server manager 429 requests the state value of one of multimedia servers 451 (polling approach); B) if a LEC requests the address of it's one of multimedia servers 451, multimedia server manager 429 requests the most current state value from that multimedia server; and C) one of multimedia servers 451 autonomously reports a state value change to multimedia server manager 429.

Multimedia server manager 429 maintains a database of all multimedia servers 451. For each of multimedia servers 451, the database contains, at least a) the most current service and availability states, along with associated timers, b) the sub-ELAN of the LES and BUS with which the multimedia server has joined, and c) the ELAN that the multimedia server serves. Table 2 is an exemplary server database.

TABLE 2

| Server | Availability State | Timer | Service State | Timer | Sub-ELAN Joined | ELAN Served |
|---|---|---|---|---|---|---|
| 451-1 | Available | 80 sec. | Idle | 10 mins. | 227 | 371 |
| . | . | . | . | . | . | . |

TABLE 2-continued

| Server | Availability State | Timer | Service State | Timer | Sub-ELAN Joined | ELAN Served |
|---|---|---|---|---|---|---|
| . | . | . | . | . | . | . |
| 451-N | Available | 5 mins. | Active | 5 mins. | 237 | 301 |

The timer field of Table 2 allows multimedia server manager 429 to age a value of the state of a multimedia server, so as to know how current is the state value.

Multimedia server manager 429 collaborates with address server 427 to determine an unused layer-3 address for a multimedia server when it determines to reassign an idle one of multimedia servers 451 to serve a different sub-ELAN than it last served, in accordance with an aspect of the invention. This new layer-3 address should be selected such that the multimedia server is on the same ELAN which it will serve. Optionally, multimedia server manager 429 collaborates with address server 427 to determine the ATM and other layer-2 addresses for a multimedia server that is being reassigned.

Multimedia server manager 429 also collaborates with configuration server 419 to determine the LES and BUS with which the multimedia server 451-N should join. When multimedia server manager 429 determines to allocate a new idle server, e.g., multimedia server 451-1, to sub-ELAN 237, it requests idle server 451-1 to unregister from it's current LES and BUS, e.g., LES 305 and BUS 307, by disconnecting itself from these servers. Once idle server 451-1 disconnects from LES 305 and BUS 307, multimedia server manager 429 sends a new layer-3 address to multimedia server 451-1 that corresponds to the subnet supported by ELAN 301. Multimedia server manager 429 also sends the ATM addresses of the LES and BUS, e.g., LES 301 and BUS 303, of the new sub-ELAN that idle server 451-1 will serve. Upon receipt of their addresses, multimedia server 451-1 joins with LES 301 and BUS 303.

Multimedia server manager 429 also maintains a database of multimedia services, and synchronizes the databases of all multimedia servers 451 with it's database, or, optionally, with each other's database. Also optionally, multimedia server manager 429 maintains with the database the authorization of sub-ELANs for specific multimedia services.

Each multimedia server 451 provides one or more multimedia services to a LEC within the sub-ELAN, or ELAN, to which it has been allocated. As noted above, exemplary services include a) multipoint video teleconferencing, b) multipoint whiteboarding, c) video-on-demand, and d) delayed playback of retrieved files. In order to obtain such services, a LEC a) connects to multimedia server manager 429, b) selects the desired multimedia service, c) requests the layer-3 address of a multimedia server which will provide the service, and d) connects to the multimedia server to obtain the service.

For example, multimedia server 451-N connects to BUS 303 via ATM connection 461 which passes through ATM switch 483 of ATM wide-area network (WAN) 131 and local ATM switch 193. Multimedia server 451-N also connects to LES 301 via ATM connection 459, which also passes through ATM switch 483 and the local ATM switch 193. When so configured, multimedia server 451-N serves all LECs in sub-ELAN 237 by using LES 301 and BUS 303, and it also serves all LECs in ELAN 301, other than the ones in sub-ELAN 237, using address server 427 and broadcast and unknown server 415 of ELAN contronect network 401.

Multimedia server 451-N monitors and stores its availability and service states, so as to be able to determine any state changes. In the event of a state change, multimedia server 451-N informs multimedia server manager 429 of the change. Also, if multimedia server manager 429 requests the state of multimedia server 451-N, multimedia server 451-N sends its current state values. The service state may be determined based on the usage of the CPU, the bandwidth connected to the multimedia server or other criteria that indicate the load of the system.

Each of multimedia servers 451 is connected to multimedia server manager 429 to receive messages to present itself to different ELANs, in accordance with an aspect of the invention. When one of multimedia servers 451 becomes idle, multimedia server manager 429 may request that multimedia server to disconnect from the LES and BUS with which it last joined. Upon receipt of such a message, the multimedia server executes the necessary steps to implement the request. Upon implementation, the multimedia server becomes available to serve other ELANs. Each of multimedia servers 451 can also receive a new layer-3 address after disconnecting from its current ELAN, in which case the multimedia server accepts the new layer-3 address and performs required system changes to present itself at that new address.

For example, when one of multimedia servers 451 is selected for allocation to ELAN 371, it receives the ATM address of LES 305 and BUS 307 and establishes ATM connections thereto, thereby becoming a part of ELAN 371.

FIGS. 2, 3, 4, 5, and 6, connected together, show an exemplary procedure for offering multimedia service to a LAN Emulation Client (LEC) in the system of FIG. 1, including a) the obtaining of an address for an available one of multimedia servers 451, and b) the monitoring of the state of multimedia servers 451 by multimedia server manager 429 of ELAN contronect network 401, in accordance with the principles of the invention. The process is entered in step 501, when a LEC determines that it requires a particular multimedia service. Thereafter, in step 502, the LEC establishes an ATM connection to multimedia server manager 429 of ELAN contronect network 401, which is at an ATM address known by the LEC. This ATM connection allows the LEC to connect to multimedia server manager 429 and request a multimedia service.

Next, in step 503, the LEC requests from multimedia server manager 429 a particular multimedia service and the layer-3 address of a multimedia server which can provide the requested service. Thereafter, conditional branch point 507 tests to determine if the LEC is authorized to use the requested multimedia service. Step 507 is performed by the multimedia server manager 429. If the test result in step 507 is NO, indicating that the LEC is not authorized for the requested multimedia service, control passes to step 511, and the process is exited.

If the test result in step 507 is YES, indicating that the LEC is authorized to use the requested multimedia service, control passes to conditional branch point 513, in which multimedia server manager 429 determines if any multimedia server that can provide the requested service and was previously allocated to the ELAN of the LEC is "busy" or "unavailable". If such an already allocated multimedia server is determined to be "busy" or "unavailable", or no multimedia server has been previously allocated, then the multimedia service that LEC is requesting cannot be provided using the present ELAN configuration. Therefore, multimedia server manager 429 will assign another one of multimedia servers 451 to serve the LEC, in accordance with an aspect of the invention.

If the test result in step 513 is YES, control passes to conditional branch point 515, which tests to determine if there are any "active" and "available" servers serving the ELAN of the LEC. If the test result in step 515 is NO, indicating that there are no other multimedia servers 451 allocated to serve the ELAN of the LEC except the one that is "busy" and/or "unavailable", control passes to step 519, which tests to determine if there are any "idle" and "available" servers known to the multimedia server manager.

If a) the test result in step 513 is NO, indicating there is an available multimedia server assigned to the LEC, or b) the test result in step 515 is YES, thus indicating that an already assigned multimedia server is available to serve the LEC, or c) if the test result in step 519 is NO, indicating that there are no other servers to serve the LEC, control passes to step 523, in which multimedia server manager 429 transmits the address of an already allocated multimedia server's layer-3 address to the LEC.

Control then passes to conditional branch point 555, in which the LEC determines if it has the ATM address of the multimedia server for which the layer-3 address was sent in step 523. If the test result in step 555 is YES, indicating that the LEC already knows the ATM address of the multimedia server, control passes to step 559, in which the LEC establishes an ATM connection to the multimedia server for obtaining the multimedia service. If the test result in step 555 is NO, indicating that the LEC does not have the ATM address of the multimedia server, control passes to step 557, in which the LEC obtains the ATM address of the multimedia server from the LES that serves the sub-ELAN of the LEC. The transition from step 555 to step 557 assumes that the LEC has the layer-2 address corresponding to the layer-3 address of the multimedia server, but does not have the ATM address. If the layer-2 address is not known, an unlikely scenario, the LEC will perform an ARP request to obtain the layer-2 address as described in step 562.

If the test result in step 519 is YES, indicating that there is an "available" and "idle" one of multimedia servers 451 that is not allocated to the ELAN of the LEC requesting the multimedia service, control passes to step 525, in which the multimedia server manager 429 chooses the best "idle" multimedia server to serve the LEC, in accordance with an aspect of the invention. Once the multimedia server is chosen, multimedia server manager 429 sets the chosen multimedia server's state to "unavailable" in step 527. This ensures that the chosen multimedia server is not available for other LECs until its allocation to the sub-ELAN is completed.

After completion of step 527, steps 531 and 533, as well as steps 537 and 539, are undertaken substantially in parallel by multimedia server manager 429. In step 531 multimedia server manager 429 determines a new layer-3 address for the newly allocated multimedia server. The new layer-3 address is determined by multimedia server manager 429 in collaboration with address server 427 of ELAN contronect network 401, which has all the layer-3 addresses in use by the ELAN in which the LEC requesting the multimedia server resides, in accordance with an aspect of the invention.

After multimedia server manager 429 receives a layer-3 address from address server 427, it sends this new layer-3 address to the multimedia server in step 533. After completion of step 533, the multimedia server has a new layer-3 address which results in the multimedia server belonging to the same ELAN as the LEC requesting the multimedia service, in accordance with an aspect of the invention.

In parallel with steps 531 and 533, multimedia server manager 429 collaborates with the configuration server of ELAN contronect network 401, in step 537, to determine the ATM addresses of the LES and BUS that serve the LEC requesting the multimedia service so that the selected multimedia server can inform the LES and BUS of the sub-ELAN to which the LEC belongs that it is joining their sub-ELAN per the above-noted LAN Emulation Over ATM specifications of the ATM forum. As a result, the multimedia server and the LEC appear on the same ELAN. After completion of step 537, control passes to step 539, in which the multimedia server manager sends the LES and BUS addresses determined in step 537 to the multimedia server which is newly allocated to serve the LEC requesting the multimedia service.

Alternatively, multimedia server manager 429 may send the ATM address of the sub-ELAN's optional LAN Emulation Configuration Server (LECS) per the ATM forum LANE specifications, from which the multimedia server can request the addresses of the LES and BUS.

Next, in conditional branch point 541, multimedia server manager 429 determines if the multimedia server completed joining the ELAN to which it was allocated by connecting to a LES and BUS of a sub-ELAN within the ELAN of the LEC requesting the multimedia service. If the test result in step 541 is NO, indicating that the connections to LES and BUS have not been completed, control passes to conditional branch point 543, in which the multimedia server manager tests if a timer has been expired. This timer is set at the time the LES and BUS ATM addresses were sent to the multimedia server in step 539. If the test result in step 543 is NO, control passes back to step 541. If the test result in step 543 is YES, indicating that the timer has expired, control passes to 519, and the process continues as described above when a new multimedia server is allocated by multimedia server manager 429.

If the test result in step 541 is YES, indicating that the newly allocated multimedia server has completed joining with the LES and BUS of a sub-ELAN of the ELAN that it will serve, which requires the multimedia server to first disconnect any already existing connections with a different LES and BUS as described above, control passes to step 547, in which multimedia server manager 429 updates it's multimedia server database to indicate that the newly allocated multimedia server is allocated to the ELAN of the LEC requesting the multimedia service. Subsequently, in step 549, multimedia server manager 429 sets the newly allocated multimedia server's state to "active". Control then passes to conditional branch point 550, in which multimedia server manager 429 tests to determine if the newly allocated multimedia server was allocated because of a request for multimedia service from a LEC. If the test result in step 550 is NO, indicating that the allocation is being performed due to a state-change, the process is exited in step 551.

If the test result in step 550 is YES, indicating that the multimedia server is allocated upon a multimedia service request from a LEC, control passes to step 552, in which the multimedia server manager sends the layer-3 address of the multimedia server to the LEC requesting the service. Control passes to step 562, in which the LEC performs an ARP to obtain the layer-2 address of the newly allocated multimedia server. Control then passes to step 557, and the process continues as described above.

After the LEC connects to the multimedia server and requests the multimedia service in step 559, control passes to conditional branch point 563, in which multimedia server manager 429 tests to determine if the multimedia server can serve any more LECs. If the test result in step 563 is YES, indicating that the LEC can serve other LECs, control passes to step 587 in which the multimedia server remains in it's "active" state. Control then passes to step 591, and the process is exited.

If the test result in step 563 is NO, indicating that the multimedia server can not serve any more LECs, control passes to step 565, in which multimedia server manager 429 changes the state of the multimedia server state to "busy". Control then passes to step 567, in which the multimedia server sends a state-change message to multimedia server manager 429 indicating that it is unable to provide service to additional LECs since it is overloaded.

Thereafter, the multimedia server manager 429 changes the state of the multimedia server to "busy", in step 569. Control then passes to conditional branch point 571, in which multimedia server manager 429 tests to determine if there are any "active" or "idle" multimedia servers serving the sub-ELAN of the requesting LEC. If the test result in step 571 is "YES", indicating that there is at least one more multimedia server serving the sub-ELAN that is not "busy", control passes to step 573, in which the multimedia server manager 429 reorders the priority of multimedia servers 451 that serves the sub-ELAN by moving the "active" server to the top of the list.

If there are both "active" and "idle" servers, then multimedia server manager 429 moves the "active" server to the top of the list. However, if there are not any "active" servers, but there is one or more "idle" servers, then multimedia server manager 429 moves one of the "idle" multimedia servers 451 to the top of the list. Step 573 ensures that when the next LEC requests a multimedia service from the multimedia server manager, a multimedia server which is not "busy" is presented to that LEC. Control then passes to step 591, and the process is exited.

If the test result in step 571 is NO, indicating that there not any other multimedia servers 451 except the "busy" server serving the sub-ELAN, control passes to conditional branch point 581, in which multimedia server manager 429 tests if there are any other "idle" and "available" multimedia servers 451 allocated for other sub-ELANs within the same ELAN as the "busy" multimedia server, or for sub-ELANs in different ELANs. If the test result in step 581 is NO, indicating that there are not any other "available" and "idle" servers, control passes to step 591, and the process is exited.

If the test result in step 581 is YES, indicating that there is at least one "idle" and "available" server, control passes to step 525. The process continues as described above between steps 525 through 549. After completion of step 549, control passes to conditional branch point 550, in which the multimedia server determines if the new server is allocated based on a request from an LEC or based on a state-change message received from a multimedia server. If the test result in step 550 is NO, indicating that the allocation has happened due to a state-change message from the multimedia server, the process is exited in step 551.

Figure 5:
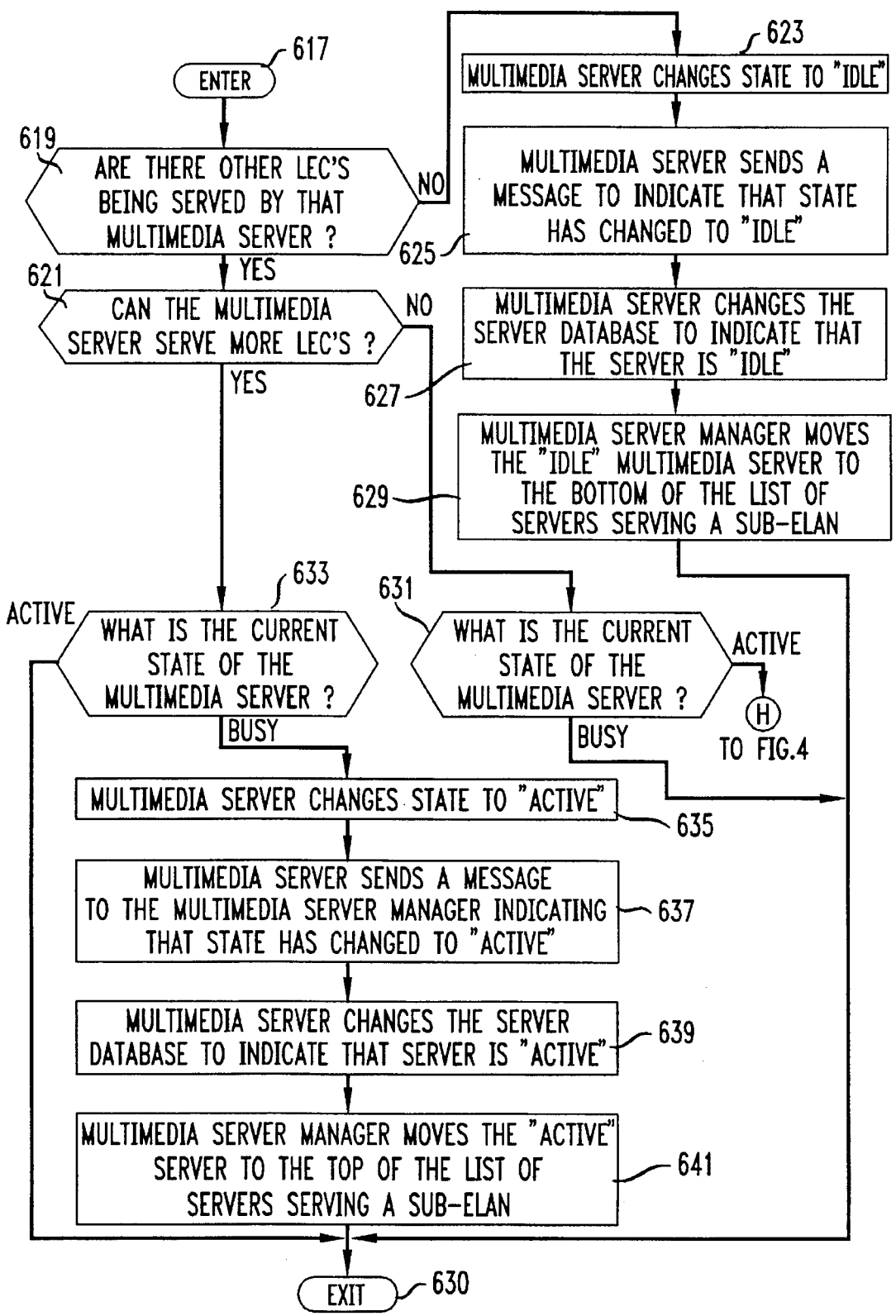

FIG. 5 shows an exemplary process of state management between the multimedia server and multimedia server manager 429. The process is entered in step 617 when a LEC drops its ATM connection with a multimedia server. Next, in conditional branch point 619, the multimedia server tests to determine if there are any other LECs using its services. If the test result in step 619 is NO, indicating that there are no other users of the multimedia server, control passes to step 623 in which the multimedia server changes it's state to "idle". Thereafter, in step 625, the multimedia server sends a message to multimedia server manager 429 indicating that the state of the server has changed to "idle". After receiving this message, in step 627, the state manager in multimedia server manager 429 changes its record in the multimedia server's state to "idle". In step 629, multimedia server manager 429 moves the "idle" server to the bottom of the list of servers serving the ELAN to ensure that if a LEC needs an "idle" server, the recently freed up server can be allocated. The process is exited in step 630.

If the test result of step 619 is YES, indicating that LECs are still being served by the multimedia server, control passes to conditional branch point 621, which tests to determine if the multimedia server can serve additional LECs. If the test result in step 621 is NO, indicating that additional LECs can not be served, control passes to conditional branch point 631, which tests to determine if the current state is "busy". If the test result in step 631 is YES, control passes to step 630, and the process is exited. If the test result in step 631 is NO, indicating that the server is not in the "busy" state, control passes to step 565, and process continues as described above.

If the test result of step 621 is YES, indicating that more LECs can be served by the multimedia server, control passes to conditional branch point 633 which tests if the current state of the multimedia server is "active". If the test result in step 633 is YES, control passes to step 630, and the process is exited. If the test result in step 633 is NO, indicating that the multimedia server is currently in a "busy" state, control passes to step 635, in which the state of the multimedia server is set to "active", since it can serve other LECs. Subsequently, in step 637, the multimedia server sends a state change message to multimedia server manager 429 to indicate that the multimedia server's state has just been changed to "active". In step 639 multimedia server manager 429 changes the server database to indicate that the new state of the multimedia server is "active". In step 641, multimedia server manager 429 moves the "active" server to the top of the list of servers serving the sub-ELAN, to ensure that this server is the next chosen. Then, process is exited in step 630.

Table 3 illustrates the prioritizing of the servers serving an ELAN. The scenario shows the ordered list of servers within multimedia server manager 429 before and after the state change of server 451-2 from "busy" to "active".

TABLE 3

| Before | | After | |
|---|---|---|---|
| Server | State | Server | State |
| 451-1 | Busy | 451-2 | Active |
| 451-2 | Busy | 451-1 | Busy |
| 451-4 | Idle | 451-4 | Idle |
| 451-9 | Idle | 451-9 | Idle |

Figure 6:
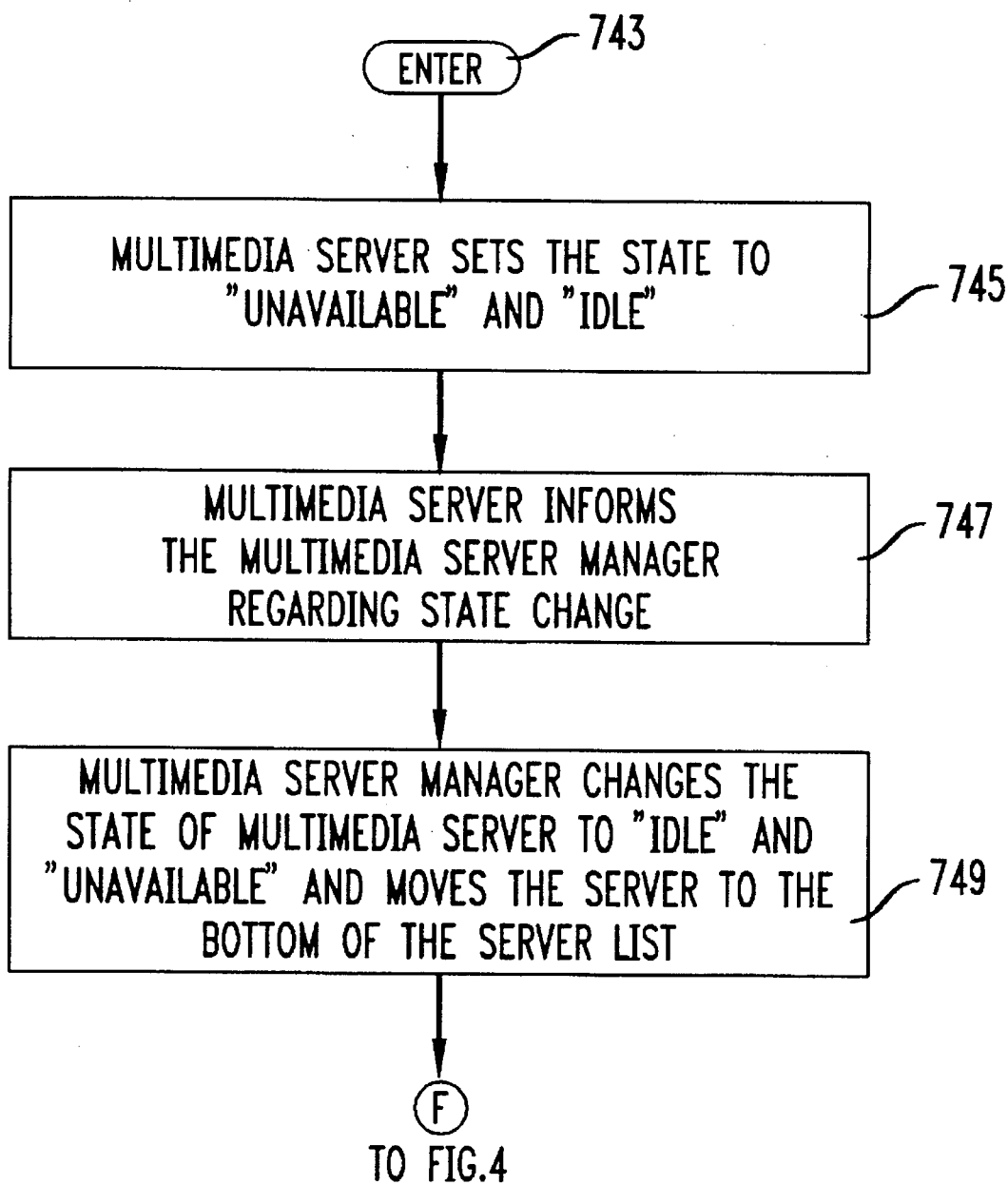

FIG. 6. shows an exemplary process for use when a multimedia server fails. The process is entered in step 743, when there occurs a) a system failure, b) a database corruption within the multimedia server, or c) possibly a network failure that makes the multimedia server unavailable to serve. Next, in step 745 the multimedia server sets its state to "idle" and "unavailable". Control passes to step 747, in which the multimedia server informs multimedia server manager 429 that its state has just been changed to "unavailable". In step 749, multimedia server manager 429 changes the state of the server in the server database to "idle" and "unavailable", and moves the server to the bottom of the list of the servers serving the sub-ELAN. Control passes to step 571, and process continues as described above.

Figure 7:
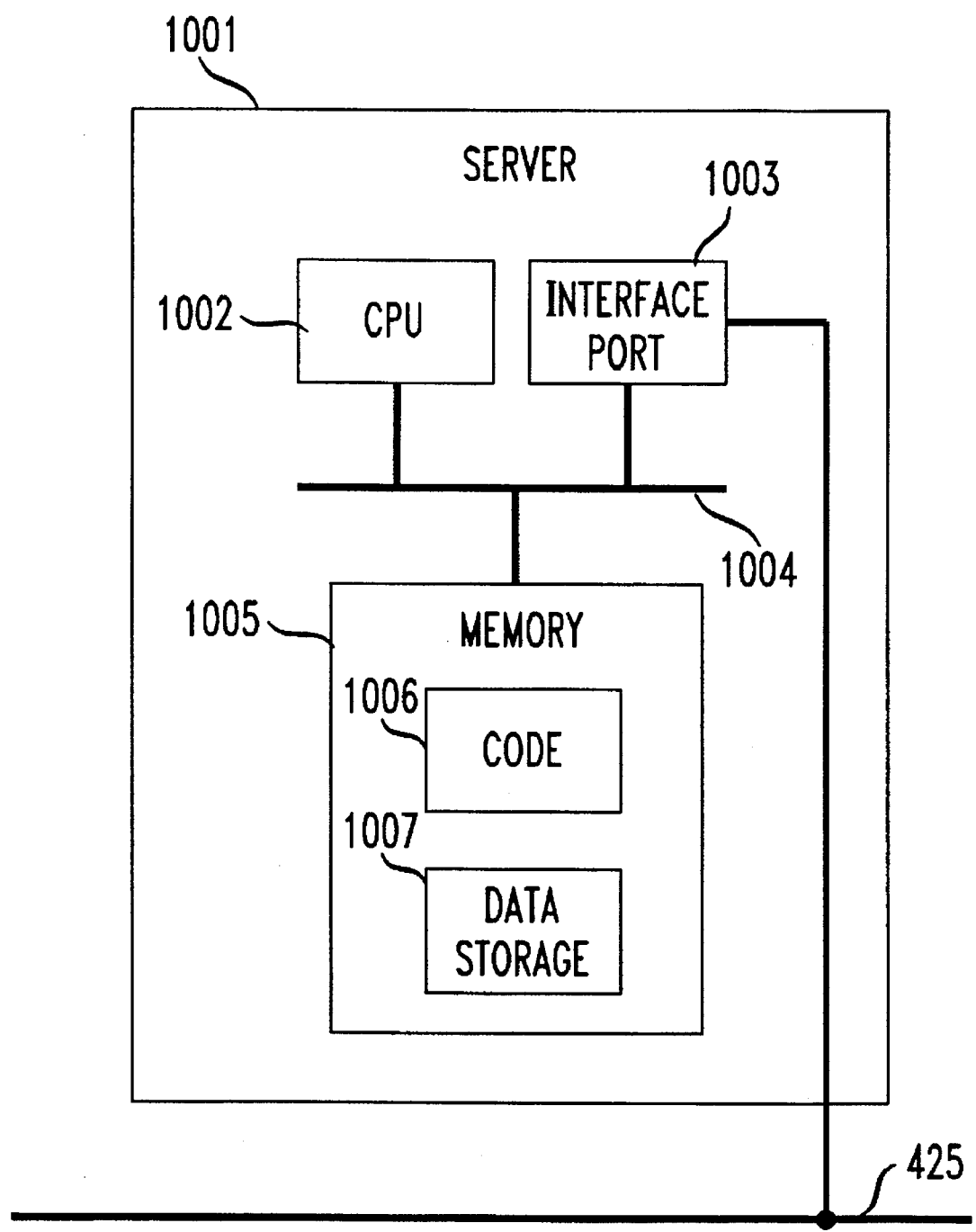
FIG. 7 is a block diagram view of an exemplary embodiment of generic server 1001, which may be used as the servers shown in FIG. 1.

FIG. 7 is a block diagram view of an exemplary embodiment of generic server 1001, which may serve as address server 427, broadcast/route server 415, configuration server, one of multimedia server 451, or a server of multimedia server manager 429. Each server 1001 includes a) central processing unit (CPU) 1002, b) interface port 1003 c) data bus 1004 and d) memory 1005. Central processing unit (CPU) 1002 provides all the computational capability necessary to control the processes of server 1001. Data bus 1004 provides for the exchange of data between the components of server 1001. Interface port 1003 provides for the exchange of data between server 1001 and devices external to server 1001, e.g., via a link to high speed backbone 425 or ATM connections. To this end, interface port 1003 contains, for example, well-known data transceivers. Memory 1005 includes 1) code portion 1006, which contains the instructions (program) used by CPU 1002 to control the processes of server 1001, such as those described herein above, and data storage portion 1007, which contains the information necessary to the server to perform its specific function, such as, an address table for an address server or ELAN configuration tables for configuration server 419.

The foregoing merely illustrates the principles of the invention. It will thus be appreciated that those skilled in the art will be able to devise various arrangements which, although not explicitly described or shown herein, embody the principles of the invention and are thus within its spirit and scope.

We claim:

1. Apparatus for providing multimedia services to local area network (LAN) emulation clients (LECs), comprising:

a plurality of sub-Emulated LANs (ELANs);

a contronect network, said contronect network including an address server, a broadcast/route server, a configuration server and a multimedia server manager, each of said sub-ELANs being connected to the contronect network via a point-to-point connection, and said contronect network configuring sub-ELANs of said plurality of sub-ELANs into a plurality of ELANs;

a plurality of separate multimedia servers each adapted for presenting itself as a multimedia server to any of said ELANs as a LAN emulation client (LEC) thereof in response to instructions from said contronect network, said multimedia servers each being connected to said multimedia server manager by a point-to-point connection.

2. The invention as defined in claim 1 wherein said multimedia servers are geographically diverse.

3. The invention as defined in claim 1 wherein said multimedia server manager stores information as to which multimedia services are provided by each of said multimedia servers.

4. The invention as defined in claim 1 wherein said multimedia server manager includes means for supplying service definitions to each of said multimedia servers.

5. The invention as defined in claim 4 wherein said service definition includes program code for performing said service.

6. The invention as defined in claim 4 wherein said service definition includes program content.

7. The invention as defined in claim 4 wherein said service definition includes video files.

8. The invention as defined in claim 4 wherein said service definition includes audio files.

9. The invention as defined in claim 4 wherein said service definition includes text files.

10. The invention as defined in claim 1 wherein said at least one of said separate multimedia servers is adapted to presenting itself as a multimedia server to one of said ELANs as a LAN emulation by configuring itself as a LEC of one of the sub-ELANs of said one of said ELANs in response to said instructions from said contronect network.

11. The invention as defined in claim 10 further wherein said at least one of said separate multimedia servers configuring itself as a LEC of one of the sub-ELANs of said one of said ELANs by establishing connections to the LES and BUS of said sub-ELAN.

12. The invention as defined in claim 11 wherein said multimedia server manager communicates with said configuration server to determine the address of the LAN emulation server (LES) and broadcast and the address of the unknown server (BUS) of one sub-ELAN of the ELAN to which said multimedia server must configure itself as a client thereof.

13. The invention as defined in claim 12 wherein said multimedia server manager transmits said determined address to said multimedia server.

14. The invention as defined in claim 1 wherein said multimedia server manager stores information as to the state of each multimedia server and the ELAN which it serves.

15. The invention as defined in claim 1 wherein said multimedia server manager monitors the availability and usage of each of said multimedia servers.

16. The invention as defined in claim 15 wherein said multimedia server manager only instructs a multimedia server to present itself as a LEC of an ELAN other than the ELAN to which the multimedia server is presently connected when said multimedia server is idle.

17. The invention as defined in claim 1 wherein the instructions from said contronect network are supplied by said multimedia server manager.

18. The invention as defined in claim 17 wherein said multimedia server manager includes means for communicating with said address server to obtain an unused layer-3 address in an ELAN for use by a multimedia server being instructed to present itself as a LEC of said ELAN.

19. The invention as defined in claim 17 wherein said multimedia server manager includes means for communicating with said address server to obtain (i) an unused layer-3 address, (ii) a corresponding layer-2 address, and (iii) a corresponding asynchronous transfer mode (ATM) address in an ELAN for use by a multimedia server being instructed to present itself as a LEC of said ELAN.

20. The invention as defined in claim 17 wherein said multimedia server manager includes means for transmitting the address of a multimedia server to a particular LEC.

21. The invention as defined in claim 20 wherein said address of a multimedia server is transmitted to a particular LEC in response to a received request from said particular LEC for a multimedia service.

22. The invention as defined in claim 20 wherein said address of a multimedia server is transmitted to a particular LEC in response to a received request transmitted from said particular LEC when said LEC does not have an address for a multimedia server.

23. The invention as defined in claim 20 wherein said transmitted address of said multimedia server is a layer-3 address.

24. The invention as defined in claim 20 wherein said transmitted address of said multimedia server is a layer-2 address.

25. The invention as defined in claim 20 wherein said transmitted address of said multimedia server is the address of an idle multimedia server.

26. The invention as defined in claim 20 wherein said transmitted address of said multimedia server is the address of an active but not busy multimedia server.

27. The invention as defined in claim 20 wherein the multimedia server whose address is transmitted is selected by said multimedia server manager to maximize the number of said plurality of multimedia servers that are idle.

28. The invention as defined in claim 1 wherein each of said multimedia servers includes:

means for receiving a layer-3 address from said contronect network;

means for receiving addresses of a LES and BUS serving a sub-ELAN to which said multimedia server will present itself;

means for disconnecting said multimedia server from the LES and BUS of the sub-ELAN to which said multimedia server is currently presenting itself;

means for establishing connections to the LES and BUS specified by said received LES and BUS address; and means for updating its layer-3 address to said received layer-3 address.

29. The invention as defined in claim 1 wherein each of said multimedia server includes:

resources for providing said multimedia services;

means for monitoring usage of said resources; and means for transmitting information indicative of said monitored usage to said contronect network.

30. The invention as defined in claim 1 wherein each of said multimedia servers includes means for receiving program content from a multimedia service from said contronect network.

31. The invention as defined in claim 1 wherein each of said multimedia servers includes means for receiving program code for a multimedia service from said contronect network.

32. A method for use in an LAN emulation client (LEC) comprising the steps of:

determining in said LEC that a multimedia service provided by a multimedia server is required; and connecting said LEC directly to a multimedia server manager of an Emulated LAN (ELAN) contronect network to obtain a layer-2 address of said multimedia server to provide said service when said LEC does not have stored therein the layer-2 address of said multimedia server.

33. A method for use in an LAN emulation client (LEC) comprising the steps of:

determining in said LEC that a multimedia service provided by a multimedia server is required; and connecting said LEC directly to a multimedia server manager of an Emulated LAN (ELAN) contronect network to obtain a layer-2 address of an idle multimedia server to provide said service when said LEC only has stored layer-2 addresses for busy multimedia servers.

\* \* \* \* \*